United States Patent
Katayama et al.

(10) Patent No.: US 12,454,279 B2
(45) Date of Patent: Oct. 28, 2025

(54) DRIVING ASSISTANCE APPARATUS

(71) Applicant: Honda Motor Co., Ltd., Tokyo (JP)

(72) Inventors: Makoto Katayama, Tokyo (JP); Koki Kazama, Tokyo (JP); Daiki Haratake, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 66 days.

(21) Appl. No.: 18/439,976

(22) Filed: Feb. 13, 2024

(65) Prior Publication Data

US 2024/0270270 A1 Aug. 15, 2024

(30) Foreign Application Priority Data

Feb. 15, 2023 (JP) .................................. 2023-021278

(51) Int. Cl.
*B60W 50/14* (2020.01)
*B60W 30/18* (2012.01)
(Continued)

(52) U.S. Cl.
CPC ...... *B60W 50/14* (2013.01); *B60W 30/18159* (2020.02); *G06V 20/52* (2022.01);
(Continued)

(58) Field of Classification Search
CPC ........... B60W 50/14; B60W 30/18159; B60W 2554/4041; B60W 2554/80; B60W 2050/0083; B60W 2050/146; B60W 2420/403; B60W 2520/06; B60W 2520/10; B60W 2554/4042; B60W 2555/60; B60W 2556/65; B60W 2554/4045;
(Continued)

(56) References Cited

U.S. PATENT DOCUMENTS

2005/0131627 A1* 6/2005 Ignatin ................. G08G 1/0104
701/117
2013/0110316 A1* 5/2013 Ogawa ............. G08G 1/096725
701/1
2022/0292958 A1 9/2022 Nagai et al.

FOREIGN PATENT DOCUMENTS

JP 2019023819 A 2/2019
JP 2022119884 A 8/2022
JP 2022138782 A 9/2022

OTHER PUBLICATIONS

Japanese Office action; Application 2023-021278; pp. 1-6; Dec. 3, 2024.

* cited by examiner

*Primary Examiner* — Sisay Yacob
(74) *Attorney, Agent, or Firm* — Duft & Bornsen, PC

(57) ABSTRACT

A driving assistance apparatus configured to perform a driving assistance for a first vehicle and a second vehicle traveling at an intersection where no traffic light is installed. The driving assistance apparatus includes an electronic control unit including a microprocessor, wherein the microprocessor is configured to perform: recognizing a surrounding environment around the first vehicle; determining a presence or absence of the second vehicle in the surrounding environment; setting a display mode of the virtual traffic light for the first vehicle and the second vehicle, based on information acquired through a communication unit of each of the first vehicle and the second vehicle and a determination result of the presence or absence of the second vehicle; and transmitting information indicating the display mode to the first vehicle and the second vehicle through the communication unit.

12 Claims, 10 Drawing Sheets

(51) Int. Cl.
*B60W 50/00* (2006.01)
*G06V 20/52* (2022.01)
*G06V 20/56* (2022.01)
*G08G 1/052* (2006.01)
*G08G 1/16* (2006.01)

(52) U.S. Cl.
CPC ............ *G06V 20/56* (2022.01); *G08G 1/052* (2013.01); *G08G 1/164* (2013.01); *G08G 1/166* (2013.01); *B60W 2050/0083* (2013.01); *B60W 2050/146* (2013.01); *B60W 2420/403* (2013.01); *B60W 2520/06* (2013.01); *B60W 2520/10* (2013.01); *B60W 2554/4041* (2020.02); *B60W 2554/80* (2020.02)

(58) Field of Classification Search
CPC . B60W 30/18154; G06V 20/52; G06V 20/56; G08G 1/052; G08G 1/164; G08G 1/166; B60K 35/81; B60K 35/28; B60K 2360/16; B60K 35/213; B60K 35/21
See application file for complete search history.

DRIVING ASSISTANCE APPARATUS

CROSS-REFERENCE TO RELATED APPLICATION

This application is based upon and claims the benefit of priority from Japanese Patent Application No. 2023-021278 filed on Feb. 15, 2023, the content of which is incorporated herein by reference.

BACKGROUND OF THE INVENTION

Field of the Invention

This invention relates to a driving assistance apparatus that assists a driving operation of a driver.

Description of the Related Art

As an apparatus of this type, there is known an apparatus configured to output a virtual traffic light or a virtual stop line indicating a temporary stop based on a travel history of a plurality of vehicles at an intersection where no traffic light or stop line is provided. Such an apparatus is described, for example, in Japanese Unexamined Patent Publication No. 2022-119884 (JP2022-119884A).

However, in the apparatus described in JP2022-119884A, it is not possible to perform traffic arrangement for a plurality of vehicles.

SUMMARY OF THE INVENTION

An aspect of the present invention is a driving assistance apparatus configured to perform a driving assistance for a first vehicle and a second vehicle traveling at an intersection where no traffic light is installed. Each of the first vehicle and the second vehicle including a display part displaying a virtual traffic light and a communication unit. The driving assistance apparatus includes an electronic control unit including a microprocessor and a memory connected to the microprocessor, wherein the microprocessor is configured to perform: recognizing a surrounding environment around the first vehicle; determining a presence or absence of the second vehicle in the surrounding environment; setting a display mode of the virtual traffic light for the first vehicle and the second vehicle, based on information acquired through the communication unit and a determination result of the presence or absence of the second vehicle; and transmitting information indicating the display mode to the first vehicle and the second vehicle through the communication unit.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to drawings.

A driving assistance apparatus according to an embodiment of the present invention provides a driving assistance to a driver of a vehicle that travels at an intersection or the like where traffic is not regulated by a traffic light.

Figure 1:
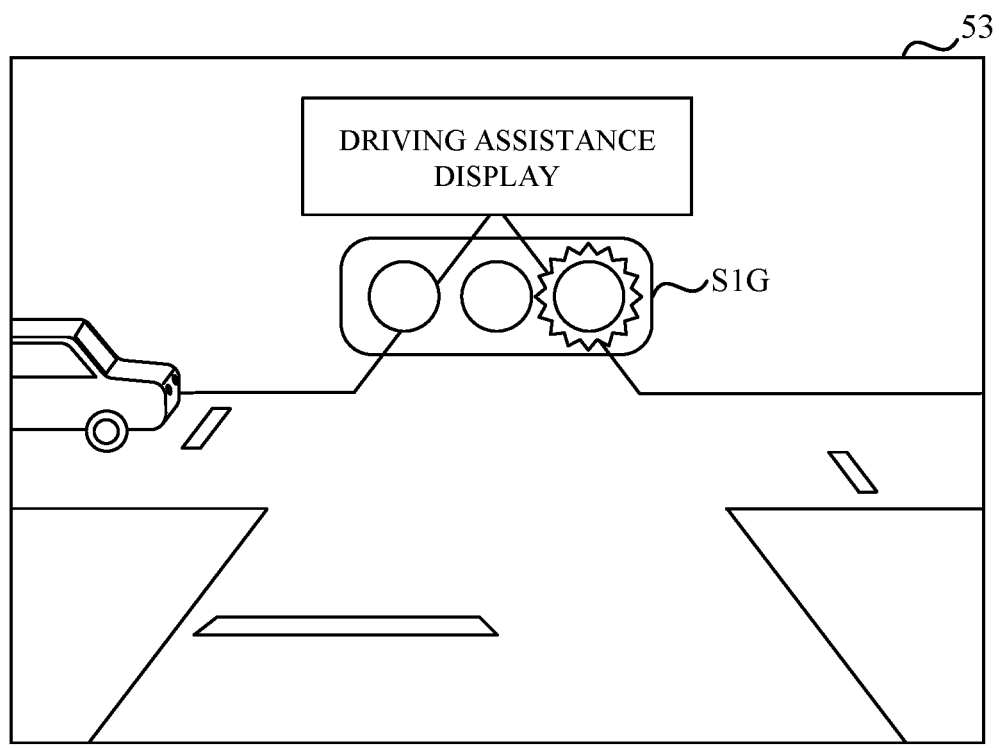
FIG. 1 is a diagram illustrating a virtual signal display provided by a driving assistance apparatus according to an embodiment of the present invention.

As a specific example, in a case where it is determined that it is more appropriate for a vehicle (hereinafter, referred to as a subject vehicle to be distinguished from other vehicles) approaching an intersection where no traffic light is installed not to enter or pass through the intersection, on the basis of a traffic status around the subject vehicle, the driving assistance apparatus performs virtual signal display (for example, red lighting) to the driver of the subject vehicle to urge stop of the subject vehicle. FIG. 1 is a diagram illustrating the virtual signal display provided by the driving assistance apparatus.

The virtual signal display is displayed, for example, on a display unit 53 provided on an instrument panel facing the driver of the subject vehicle. A display of a navigation unit arranged in the vicinity of the instrument panel can also be used as the display unit 53. The display unit that performs the virtual signal display may be configured by a head-up display that projects image information onto a windshield or a panel provided in the vicinity of the windshield of the subject vehicle.

The driving assistance apparatus performs the virtual signal display (for example, blinking in red) also to a driver of another vehicle located around the subject vehicle to urge temporary stop of the other vehicle, and notifies the subject vehicle at an intersection that the other vehicle is being urged to stop. Then, in a case here it is determined that the subject vehicle has stopped after the red blinking display for the other vehicle, the red blinking display as the virtual signal display for the driver of the other vehicle is switched to the yellow blinking display to urge the other vehicle to enter the intersection while paying attention to other traffic.

In this manner, the driving assistance apparatus performs traffic arrangement using the virtual signal display for each of the driver of the subject vehicle and the driver of the other vehicle at an intersection or the like where traffic arrangement by a traffic light is not performed. In other words, in the embodiment, an intersection where traffic arrangement is performed by the traffic light is excluded from the intersection where traffic arrangement as the driving assistance is to be performed.

Figure 2A:
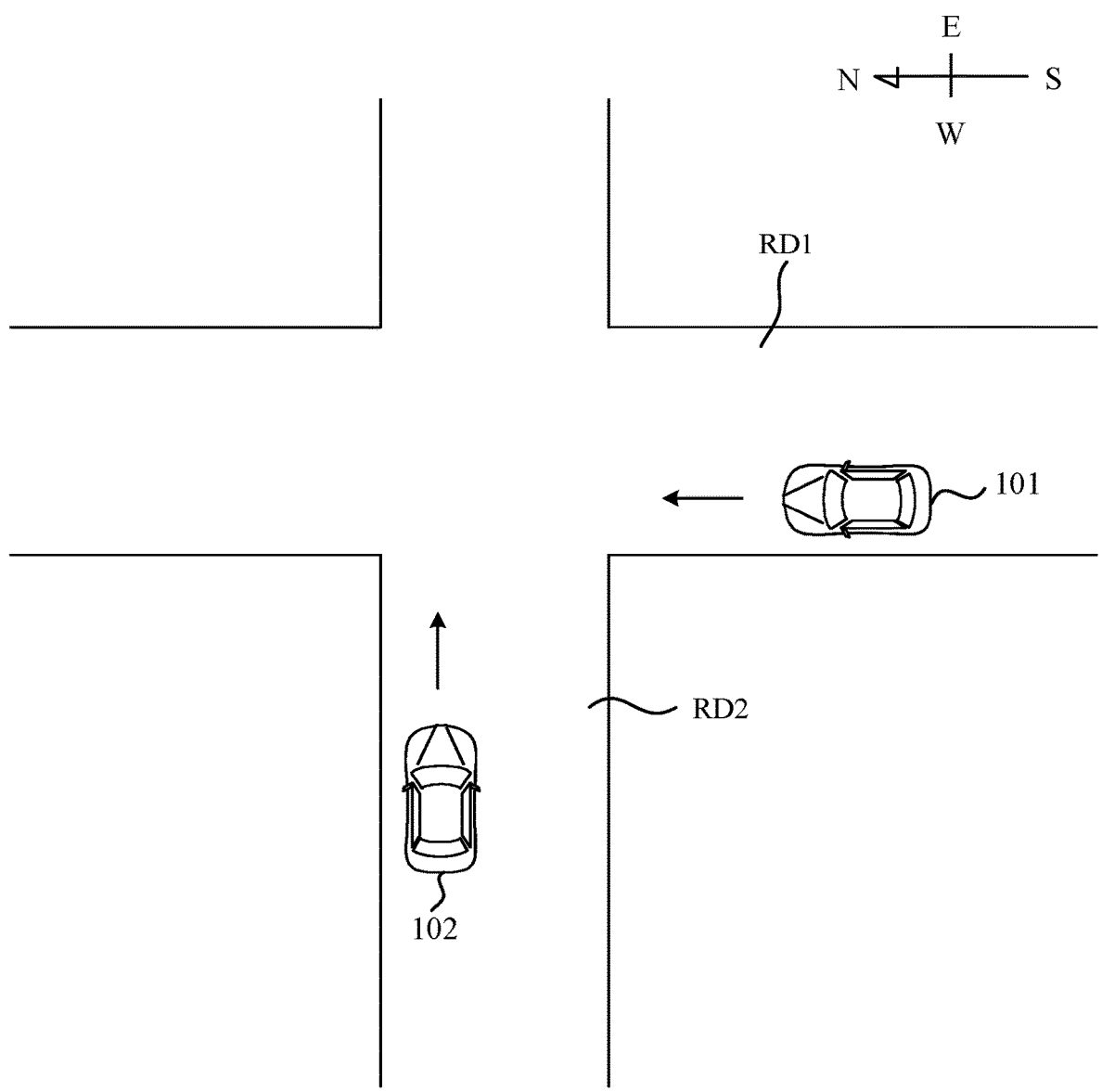
FIG. 2A is a diagram illustrating an example of an intersection to which the driving assistance apparatus according to the embodiment of the present invention is applied.
Figure 2B:
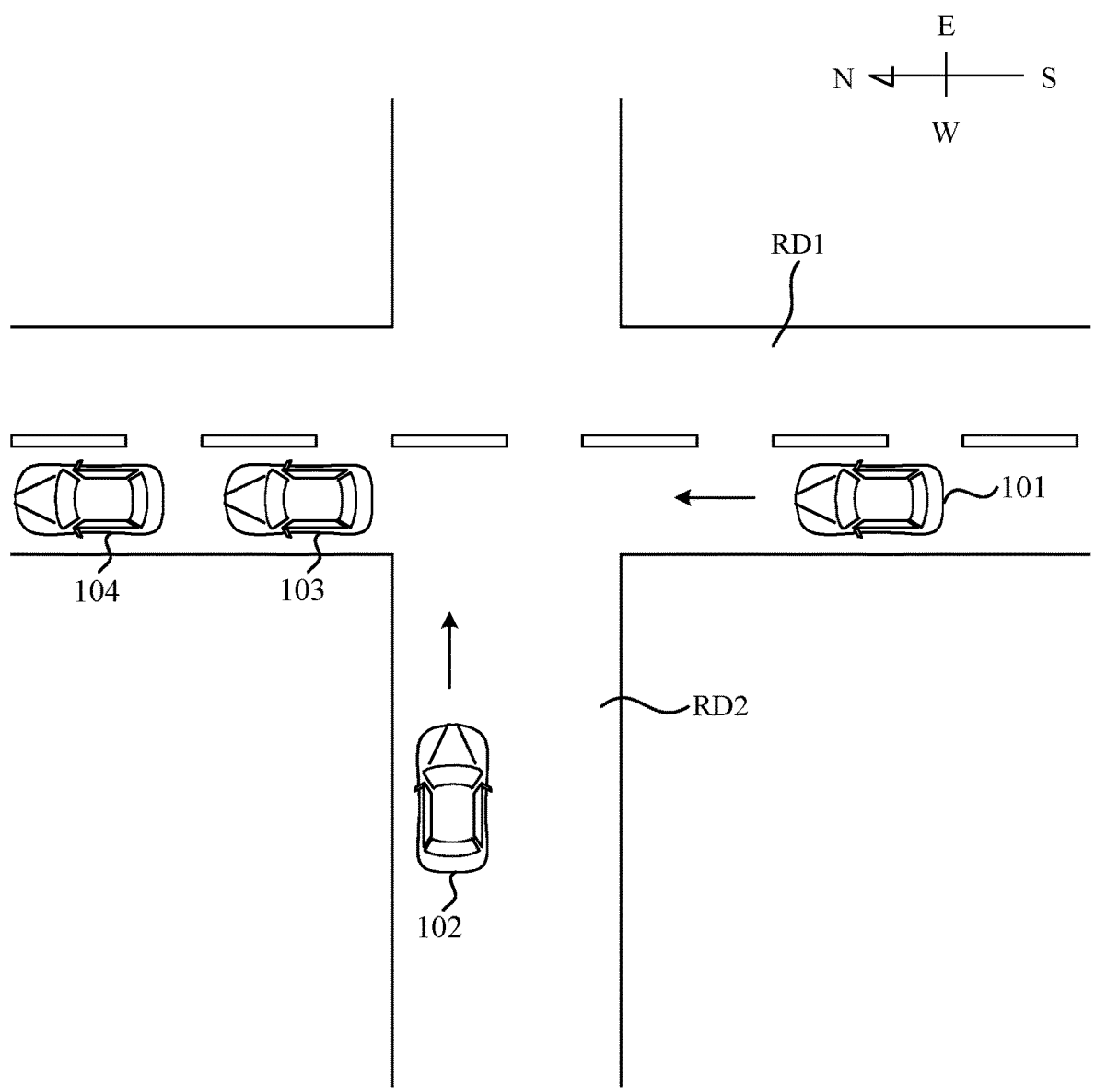
FIG. 2B is a diagram illustrating another example of an intersection to which the driving assistance apparatus according to the embodiment of the present invention is applied.
Figure 2C:
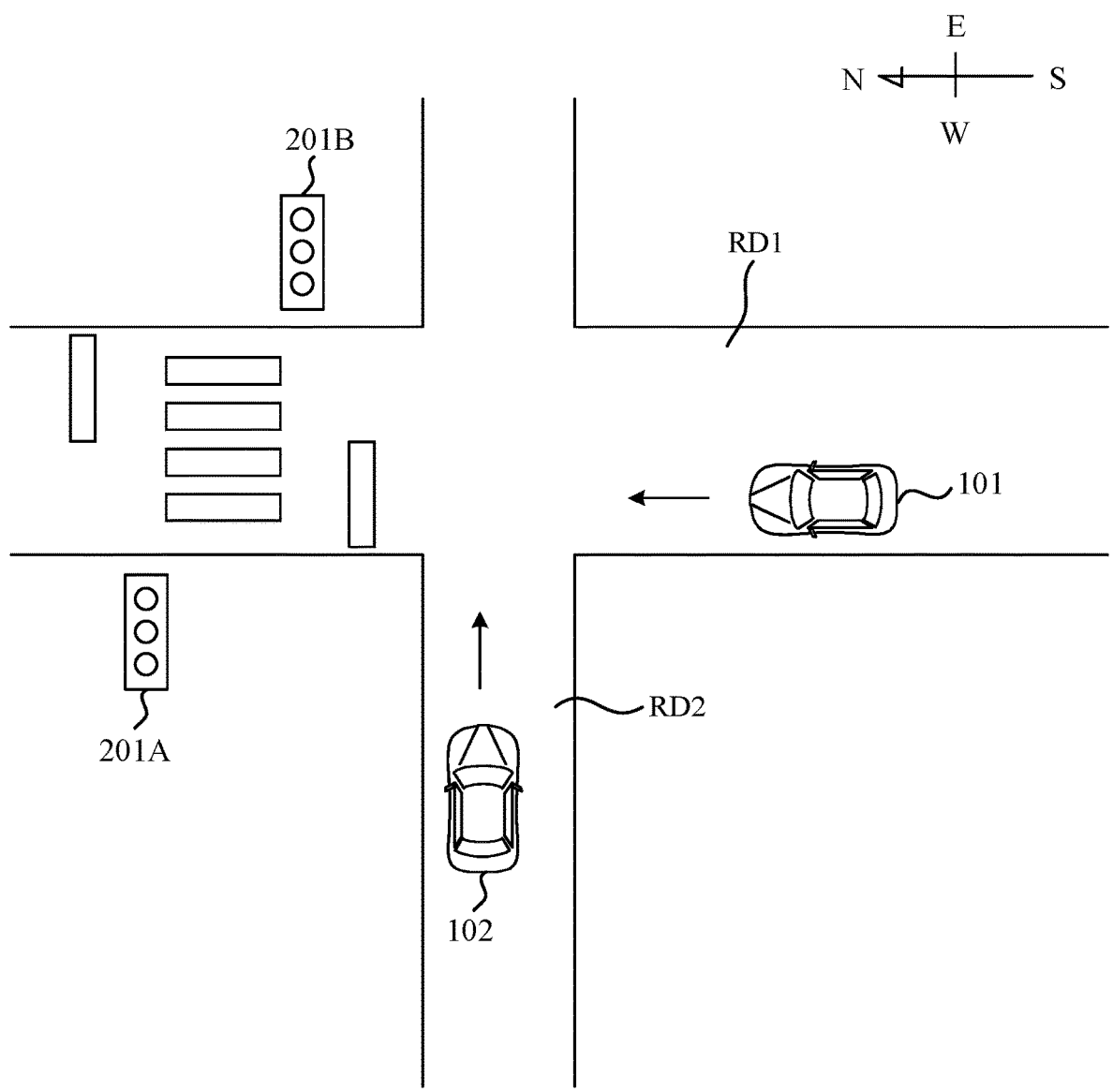
FIG. 2C is a diagram illustrating further other example of an intersection to which the driving assistance apparatus according to the embodiment of the present invention is applied.

Details of the driving assistance apparatus described above will be described in more detail. FIGS. 2A, 2B, and 2C are diagrams illustrating an example of an intersection where the driving assistance apparatus according to the embodiment provides driving assistance. In FIGS. 2A to 2C, examples of the vehicles traveling on the left side of the road are illustrated.

(1) Example 1 of Intersection

FIG. 2A is a schematic diagram illustrating an intersection where no traffic light is installed. Since intersecting roads RD1 and RD2 are equal in width, there is no priority/non-priority distinction between the roads RD1 and RD2. That is, neither of the roads RD1 and RD2 has a road center line or the like penetrating through the intersection, or neither of the roads RD1 and RD2 has a "priority road" designated by a road sign or the like. Further, neither of the roads RD1 and RD2 has a stop line or a sign or the like indicating a temporary stop at an entrance of the intersection. In both the roads RD1 and RD2, a stop line or a sign or the like indicating a temporary stop may be present at the entrance of the intersection.

(2) Example 2 of Intersection

FIG. 2B is a schematic diagram illustrating another intersection where no traffic light is installed. One of the intersecting roads RD1 and RD2 (for example, road RD1) is prioritized, but there is a traffic jam on the road RD1 ahead of the intersection with the road RD2 (north side of the intersection in FIG. 2B).

(3) Example 3 of Intersection

FIG. 2C is a schematic diagram illustrating another intersection where no traffic light is installed. Similar to the intersection of Example 1, the intersecting roads RD1 and RD2 have no priority/non-priority distinction. However, the intersection is different from the intersection of Example 1 in that, in the road RD1, a crosswalk is provided ahead of the intersection with the road RD2 (north side of the intersection in FIG. 2C), and traffic lights 201A and 201B for pedestrians crossing the road RD1 are installed.

FIGS. 2A, 2B, and 2C illustrate an example in which a subject vehicle 101 travels on the road RD1 from the south to the north, and another vehicle 102 travels on the road RD2 from the west to the east. In FIGS. 2A and 2C, there is no preceding vehicle traveling in front (north side of the intersection in FIGS. 2A and 2C) of the subject vehicle 101. Further, in FIG. 2B, other vehicles 103 and 104 as preceding vehicles are present and staying in front (north side of the intersection in FIG. 2B) of the subject vehicle 101.

In the traffic lights 201A and 201B of FIG. 2C, for example, the display for the subject vehicle 101 traveling on the road RD1 is switched from green lighting (blue lighting) to yellow lighting and then to red lighting on the basis of a button operation (not illustrated) by the pedestrian, for example. Then, the lighting may be configured to be switched to green lighting when a predetermined time elapses after switching to the red lighting. The traffic lights 201A and 201B may switch between red blinking and red lighting.

Figure 3:
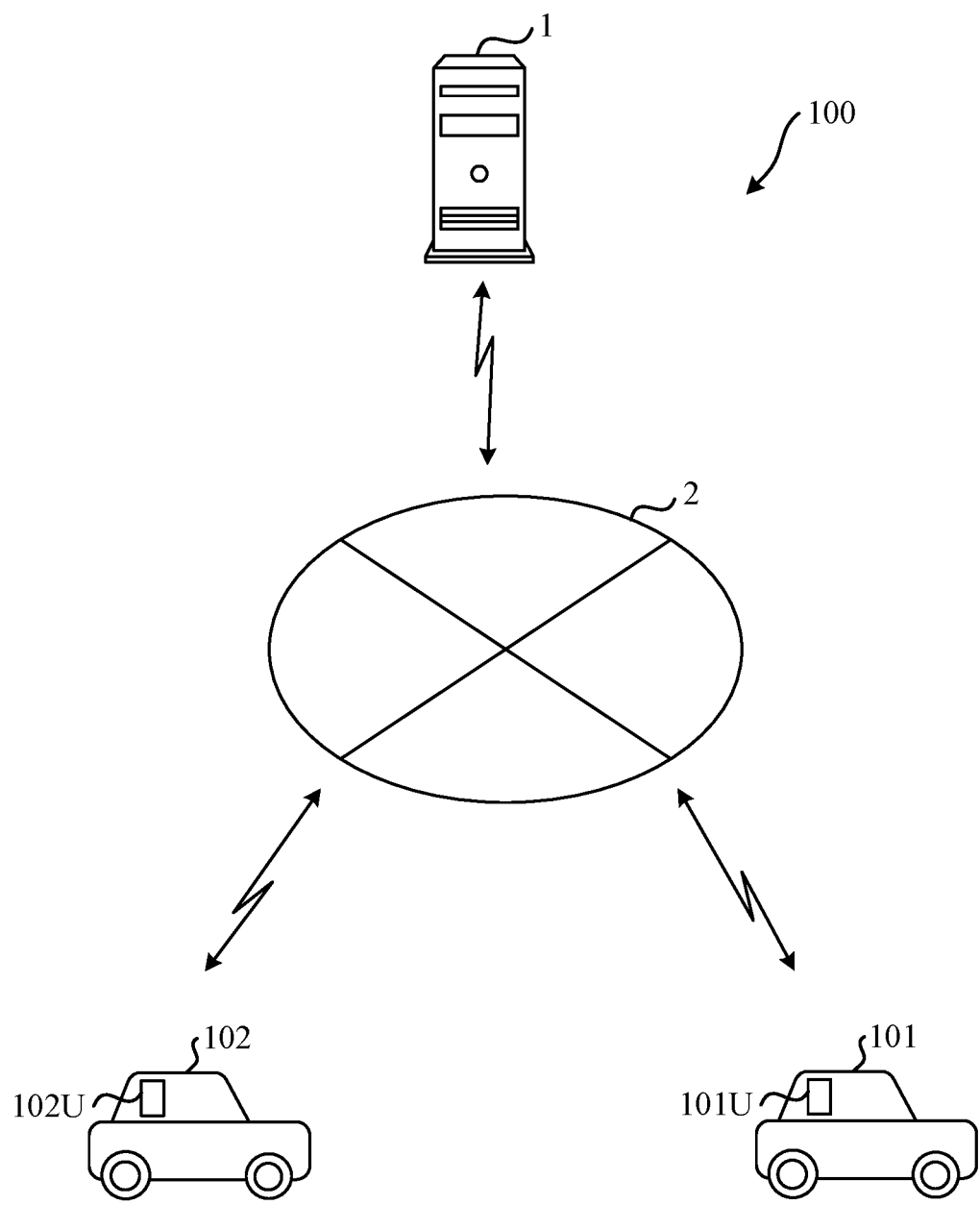
FIG. 3 is a diagram schematically illustrating a configuration of the driving assistance apparatus according to the embodiment of the present invention.

FIG. 3 is a diagram schematically illustrating a configuration of a driving assistance apparatus 100 according to the embodiment. In FIG. 3, the subject vehicle 101, the other vehicle 102, and a server device 1 as the driving assistance apparatus are shown. As described above, the driving assistance apparatus 100 does not provide a driving assistance to a vehicle that is going to enter an intersection where traffic arrangement by a traffic light is performed, but provides the driving assistance to a vehicle that is going to enter an intersection where traffic arrangement by a traffic light is not performed.

In-vehicle terminals 101U and 102U respectively mounted on the subject vehicle 101 and the other vehicle 102 are configured to be able to communicate with the server device 1 via a communication network 2. The communication network 2 includes not only a public wireless communication network represented by the Internet network, a mobile telephone network, or the like, but also a closed communication network provided for every predetermined management region, for example, a wireless local area network (LAN), Wi-Fi (registered trademark), or the like.

Although only the subject vehicle 101 and the other vehicle 102 are illustrated in FIG. 3, other vehicles other than the other vehicle 102 may be present.

Figure 4:
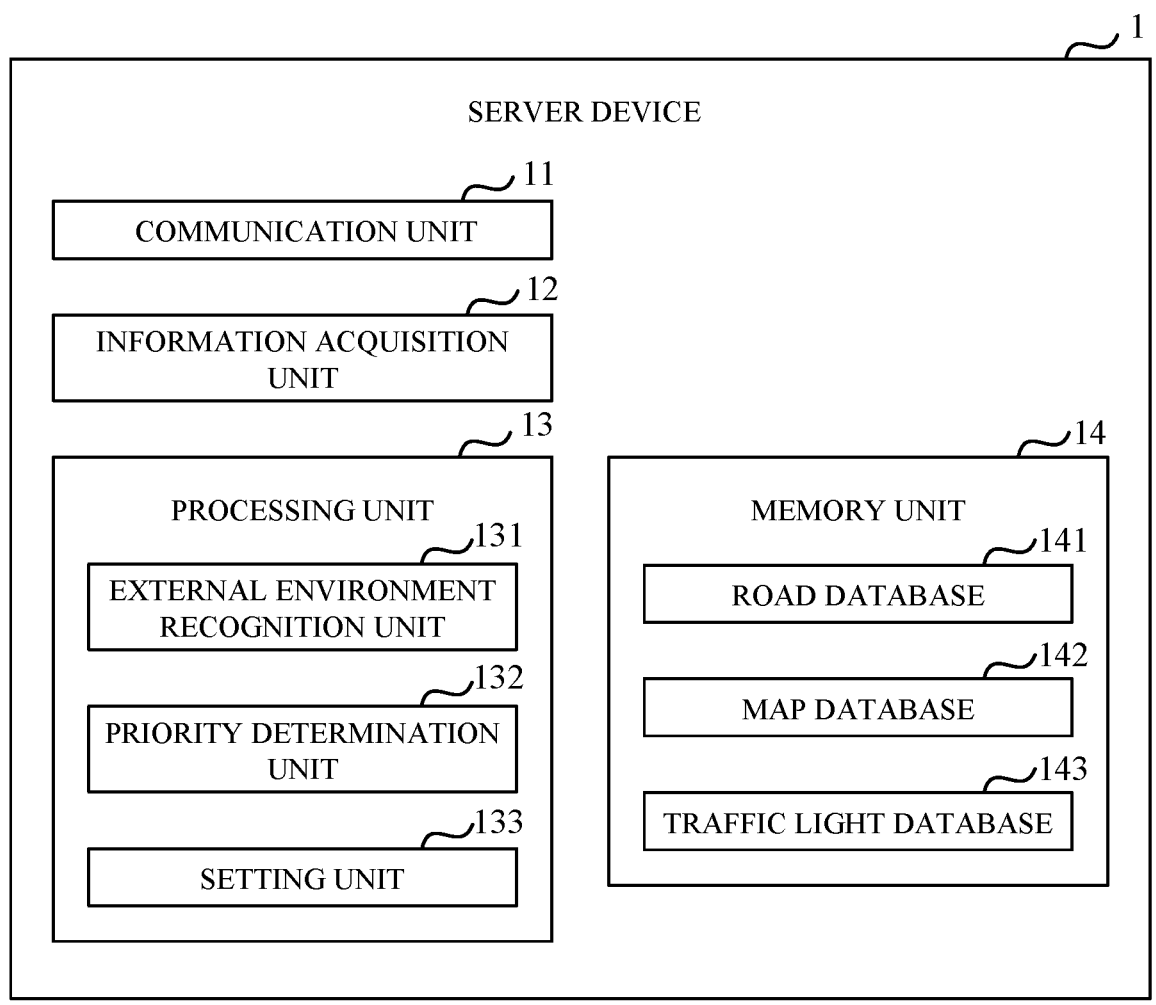
FIG. 4 is a block diagram illustrating a configuration of a main part of a server device of FIG. 3.

FIG. 4 is a block diagram illustrating a configuration of a main part of the server device 1 of FIG. 3. The server device 1 is managed by a business entity or the like that provides a driving assistance service. The server device 1 may be configured using a virtual server function on a cloud, or may be configured to be distributed to a plurality of terminals. For example, the server device may be distributed and arranged for each predetermined management area.

The server device 1 includes a communication unit 11, an information acquisition unit 12, a processing unit 13, and a memory unit 14. The communication unit 11 is configured to be able to communicate with external devices such as the in-vehicle terminals 101U and 102U mounted on the subject vehicle 101 and the other vehicle 102 via the communication network 2. The communication unit 11 functions as an output unit that transmits information to the vehicles via communication units of the in-vehicle terminals 101U and 102U. With such a configuration, the server device 1 can transmit and receive necessary information to and from the in-vehicle terminals 101U and 102U.

The information acquisition unit 12 acquires movement information of the vehicles together with time information at predetermined time intervals, from the in-vehicle terminals 101U and 102U of the traveling subject vehicle 101 and the other traveling vehicle 102 via the communication unit 11. The movement information of the vehicle includes, for example, information indicating a vehicle ID, a traveling direction, a vehicle speed, a traveling position, and an operation state of a turn signal (direction indicator) of the vehicle. The information acquisition unit 12 may also acquire the operation states of the traffic lights 201A and 201B at the intersection illustrated in FIG. 2C, from a controller of a traffic light (not illustrated), a traffic control center (not illustrated), or the like via the communication unit 11.

The processing unit 13 includes a computer including a CPU (microprocessor) and its peripheral circuits. The processing unit 13 executes predetermined processing on the basis of the information acquired by the information acquisition unit 12, the data stored in the memory unit 14, and the like. The processing unit 13 also outputs control signals to the communication unit 11, the information acquisition unit 12, and the memory unit 14.

The processing unit 13 further functions as an external environment recognition unit 131, a priority determination unit 132, and a setting unit 133 by executing a program stored in advance in the memory unit 14.

The external environment recognition unit 131 recognizes a traffic circumstance around each vehicle on the road, for example, on the basis of image information captured by an imaging device such as a camera and information acquired through the communication. The traffic circumstance is a circumstance in which vehicles and the like (for example, a four-wheeled vehicle, a two-wheeled vehicle, a pedestrian, or the like) around the vehicle come and go, and includes the number of moving vehicles and the like, a movement direction, a movement speed, the number of passes per unit time, and the like.

The external environment recognition unit 131 also functions as a surrounding vehicle determination unit that recognizes a surrounding environment of the subject vehicle 101 and determines the presence or absence of another vehicle 102 in the surrounding environment.

The imaging device may be a camera (first camera) mounted on each vehicle or a camera (second camera) provided at an intersection.

The priority determination unit 132 determines a level of priority among a plurality of vehicles entering the intersection on the basis of the information acquired by the information acquisition unit 12, the data stored in the memory unit 14, and the like, and determines a vehicle to proceed ahead and a vehicle to proceed later.

The setting unit 133 sets a display mode of a virtual traffic light provided as driving assistance information for the driver of the vehicle. The display modes are lighting colors and lighting states of the virtual traffic light. For example, the display mode is red lighting in the case of urging stop of the vehicle, red blinking in the case of urging temporary stop of the vehicle, and yellow blinking in the case of urging entry to an intersection with attention to other traffic.

The memory unit 14 has a volatile or nonvolatile memory (not illustrated). The memory unit 14 stores various programs executed by the processing unit 13, various kinds of data, and the like. The memory unit 14 also functions as a road database 141, a map database 142, and a traffic light database 143.

The road database 141 stores road information registered in advance. The road information includes position information of each intersection and information of a priority road.

The map database 142 stores map information registered in advance. The map information is associated with position information of each intersection and position information of each traffic light.

The traffic light database 143 stores traffic light information registered in advance. The traffic light information includes position information of each traffic light.

Figure 5:
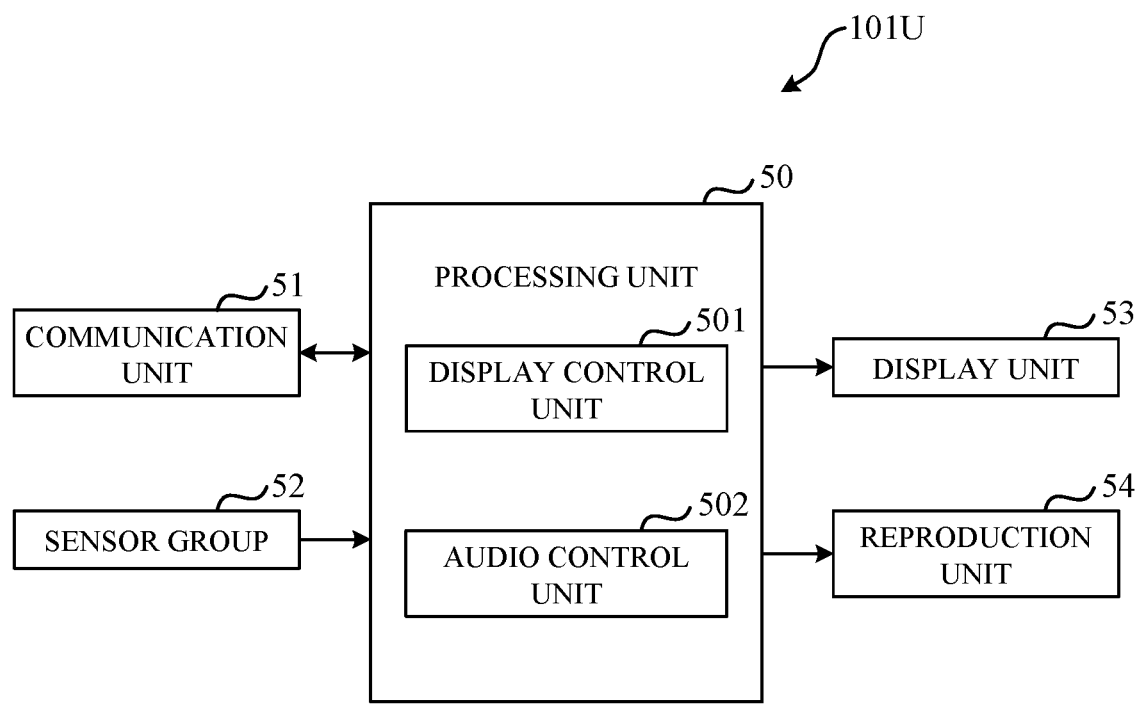
FIG. 5 is a block diagram illustrating a configuration of a main part of an in-vehicle terminal of FIG. 3.

FIG. 5 is a block diagram illustrating a configuration of a main part of the in-vehicle terminal 101U. The configuration of the in-vehicle terminal 102U is also similar to that of the in-vehicle terminal 101U. As illustrated in FIG. 5, the in-vehicle terminal 101U includes a processing unit 50, a communication unit 51, a sensor group 52, the display unit 53, and a reproduction unit 54.

The communication unit 51 is configured to wirelessly communicate with an external device such as the server device 1 via the communication network 2.

The sensor group 52 is a general term for a plurality of sensors that detect the state and the like of the vehicle 101. The sensor group 52 includes, for example, a positioning sensor, a vehicle speed sensor, a direction sensor, and a turn signal sensor. The sensor group 52 also includes an image sensor or the like built in a camera that is mounted on the vehicle 101 and that detects an external circumstance around the vehicle 101.

The positioning sensor receives a positioning signal transmitted from a GPS satellite or the like, and measures a current position of the vehicle 101 on the basis of the positioning signal. The vehicle speed sensor detects a traveling speed (vehicle speed) of the vehicle 101. The direction sensor detects the traveling direction of the vehicle 101 from a rotation difference between the right and left wheels, geomagnetism, a gyro, and the like. The turn signal sensor detects an operation state of the turn signal.

The processing unit 50 includes a computer including a CPU (microprocessor) and its peripheral circuits. The processing unit 50 executes a predetermined processing on the basis of information acquired from the outside via the communication unit 51 and of information detected by the sensor group 52. The processing unit 50 also outputs control signals to the communication unit 51, the display unit 53, and the reproduction unit 54.

The processing unit 50 functions as a display control unit 501 and an audio control unit 502 by executing a program stored in a storage area in the CPU in advance.

The display control unit 501 causes the display unit 53 to display the virtual signal display illustrated in FIG. 1 on the basis of setting information of the virtual traffic light acquired via the communication unit 51.

In a case where the virtual signal display is performed on the display unit 53, the audio control unit 502 causes a speaker or the like as the reproduction unit 54 to reproduce an audio message or the like such as "driving assistance display is performed", for example.

The processing unit 50 transmits, as the movement information of the vehicle 101, information (information indicating a traveling direction, a vehicle speed, a traveling position, and a turn signal operation state of the vehicle 101) detected by the sensor group 52 together with the ID of the vehicle 101 and the time information to the external device such as the server device 1 via the communication unit 51 as necessary.

Figure 6:
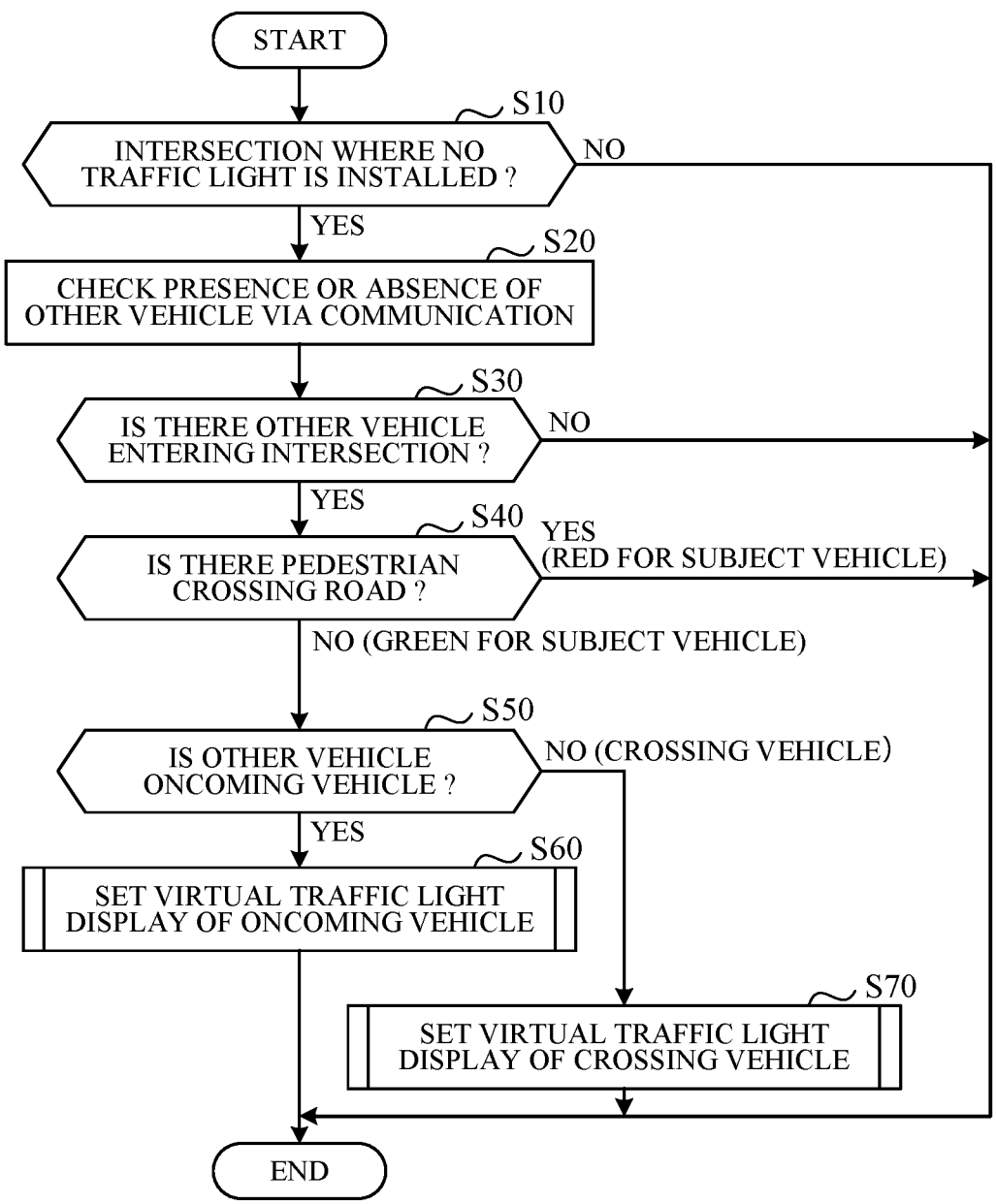
FIG. 6 is a flowchart illustrating an example of a driving assistance processing performed by the server device of FIG. 3.

FIG. 6 is a flowchart illustrating a flow of driving assistance processing performed by the server device 1. The processing unit 13 of the server device 1 repeatedly executes the processing illustrated in FIG. 6. The subject vehicle 101 and the other vehicle 102 transmit movement information of the own vehicle every predetermined time during traveling. When receiving the movement information from the subject vehicle 101 and the other vehicle 102, the processing unit 13 performs the following processing for each target intersection in a case where the vehicle that has transmitted the movement information is approaching the target intersection for traffic arrangement.

In a case where movement information is received from two vehicles approaching the same intersection, for convenience, the vehicle that has transmitted the movement information first is referred to as the subject vehicle 101, and the vehicle that has transmitted the movement information later is referred to as the other vehicle 102. Hereinafter, it is assumed that the vehicle travels on the left side of the road, for example, as like in Japan.

In S10 (S: processing step), the processing unit 13 determines whether or not the subject vehicle 101 is approaching an intersection where no traffic light is installed on the basis of the movement information received by the communication unit 11. By referring to the road database 141, the map database 142, and the traffic light database 143, in a case where the subject vehicle 101 travels within a predetermined distance (for example, 10 m) from the center of the intersection where no traffic light is provided, the processing unit 13 makes an affirmative determination in S10, and proceeds to S20. On the other hand, in a case where the subject vehicle 101 is not approaching an intersection or in a case where the subject vehicle 101 is approaching an intersection provided with a traffic light, the processing unit 13 makes a negative determination in S10 that there is no need for a traffic arrangement as the driving assistance, and ends the processing in FIG. 6.

In S20, the processing unit 13 checks the presence or absence of the other vehicle 102 via communication. Next, in S30, the processing unit 13 determines whether or not there is another vehicle 102 entering the same intersection on the basis of the movement information received by the communication unit 11, using the external environment recognition unit 131. The external environment recognition unit 131 performs the determination by referring to the road database 141, the map database 142, and the traffic light database 143. The processing unit 13 makes an affirmative determination in S30 in a case where the other vehicle 102 enters the intersection that the subject vehicle 101 approaches or in a case where entry of the other vehicle 102 to the intersection that the subject vehicle 101 approaches is expected. On the other hand, in a case where the other vehicle 102 is not approaching the same intersection, the processing unit 13 makes a negative determination in S30 that there is no need for the traffic arrangement as the driving assistance, and ends the processing in FIG. 6.

In a case where an affirmative determination is made in S30, the processing proceeds to S40. In S40, the processing unit 13 determines whether or not a pedestrian is crossing by communication. For example, in a case where an intersection that the subject vehicle 101 and the other vehicle 102 are approaching corresponds to the intersection of Example 3 (FIG. 2C), the processing unit 13 makes the determination on the basis of the operation state information of the traffic lights 201A and 201B acquired by the information acquisition unit 12. In a case where the intersection that the subject vehicle 101 and the other vehicle 102 are approaching corresponds to the intersection of Example 1 (FIG. 2A) and the intersection of Example 2 (FIG. 2B), the traffic lights 201A and 201B for pedestrians are not installed, and thus, the processing of S40 may be omitted.

In a case where the operation states of the traffic lights 201A and 201B are red for the subject vehicle 101, the processing unit 13 makes an affirmative determination in S40, determines that there is no need for the traffic arrangement as the driving assistance, and ends the processing in FIG. 6. On the other hand, in a case where the operation states of the traffic lights 201A and 201B are green for the subject vehicle 101, the processing unit 13 makes a negative determination in S40. In a case where a negative determination is made in S40, the processing proceeds to S50.

In S50, the processing unit 13 determines, in the external environment recognition unit 131, whether or not the other vehicle 102 entering the same intersection is an oncoming vehicle for the subject vehicle 101 on the basis of the movement information of the subject vehicle 101 and the other vehicle 102 received by the communication unit 11. In a case where the other vehicle 102 is an oncoming vehicle (traveling in the opposite direction on the same road RD1 as the road RD1 on which the subject vehicle 101 travels), the processing unit 13 makes an affirmative determination in S50. In a case where the other vehicle 102 is a crossing vehicle (traveling on the road RD2 intersecting the road RD1 on which the subject vehicle 101 travels), the processing unit 13 makes a negative determination in S50. In a case where an affirmative determination is made in S50, the processing proceeds to S60, and in a case where a negative determination is made in S50, the processing proceeds to S70.

In S60, the processing unit 13 sets, in the setting unit 133, the virtual traffic light display for the oncoming vehicle as the driving assistance. Details of the processing of S60 will be described later with reference to the flowchart illustrated in FIG. 7.

In step S70, the processing unit 13 sets, in the setting unit 133, the virtual traffic light display for the crossing vehicle as the driving assistance. Details of the processing of S70 will be described later with reference to the flowchart illustrated in FIG. 8.

Figure 7:
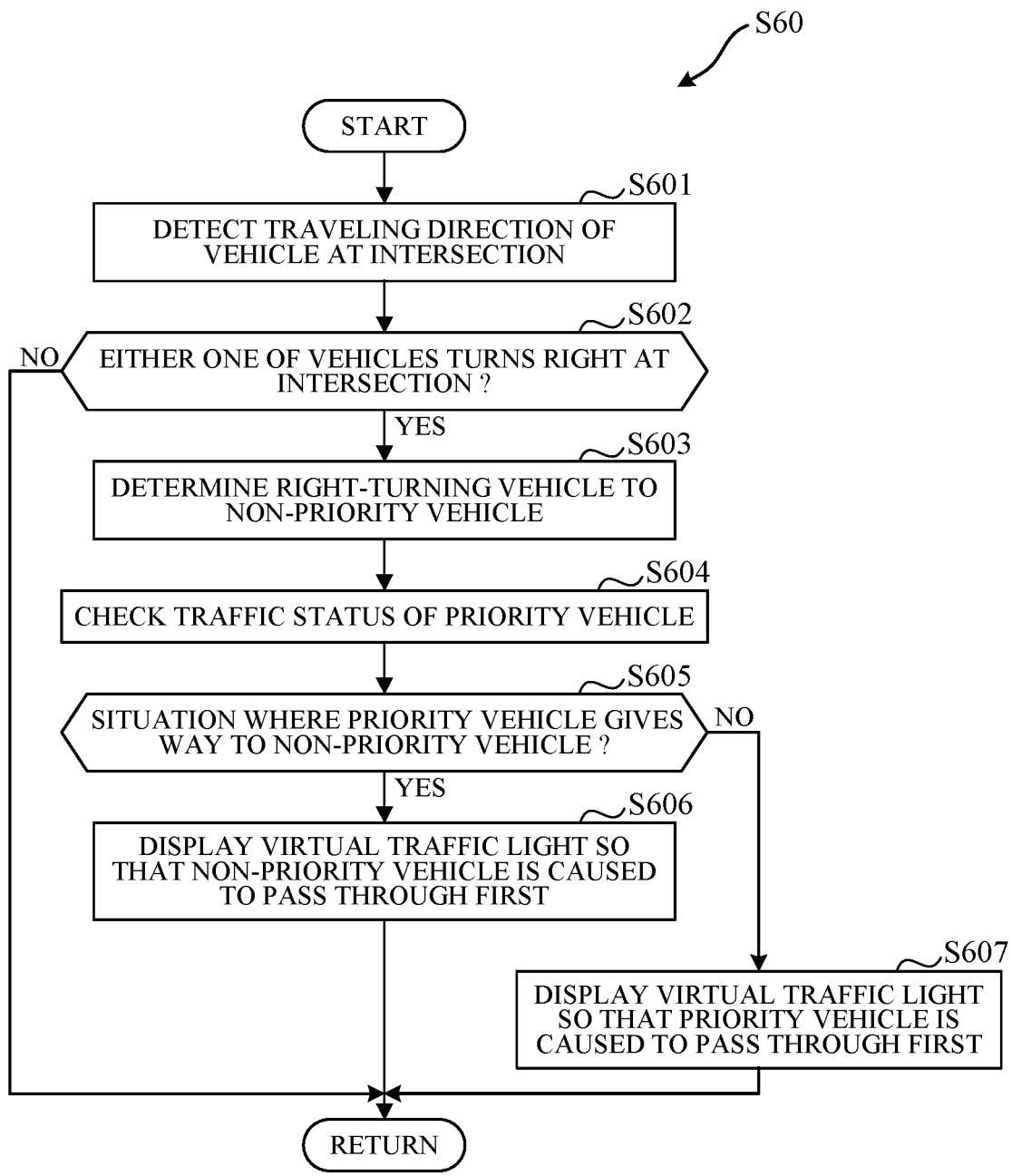
FIG. 7 is a flowchart illustrating a part of the flowchart of FIG. 6 in detail.

FIG. 7 is a flowchart illustrating an example of setting processing performed by the setting unit 133 in S60.

In S601, the setting unit 133 detects the traveling direction of the vehicle at the intersection. For example, the setting unit 133 detects the traveling directions of the subject vehicle 101 and the other vehicle 102 at the intersection that both the vehicles approach on the basis of the movement information (particularly, turn signal operation state) of the subject vehicle 101 and the other vehicle 102 received by the communication unit 11.

Next, in S602, the setting unit 133 determines whether or not either the subject vehicle 101 or the other vehicle 102 will turn right at the intersection. The setting unit 133 makes an affirmative determination in S602 in a case where one of the subject vehicle 101 and the other vehicle 102 turns right. In a case where an affirmative determination is made in S602, the processing proceeds to S603. In a case where neither the subject vehicle 101 nor the other vehicle 102 turns right, or in a case where both the subject vehicle 101 and the other vehicle 102 turn right, the setting unit 133 makes a negative determination in S602 and ends the processing in FIG. 7. In a case where a negative determination is made in S602, since the paths of the subject vehicle 101 and the other vehicle 102 do not cross each other, it is determined that there is no need for the traffic arrangement as the driving assistance, the processing returns to FIG. 6, and the processing in FIG. 6 is ended.

In S603, the setting unit 133 determines the vehicle to turn right among the subject vehicle 101 and the other vehicle 102, as a non-priority vehicle. In this case, the vehicle to turn left or to go straight among the subject vehicle 101 and the other vehicle 102 is determined as a priority vehicle.

Next, in S604, the setting unit 133 checks, in the external environment recognition unit 131, the traffic status (in particular, whether there is a traffic jam ahead of the intersection) of the vehicle determined as the priority vehicle, on the basis of the movement information of the subject vehicle 101 and the other vehicle 102 received by the communication unit 11.

Next, in S605, the setting unit 133 determines whether or not the priority vehicle should allow the non-priority vehicle to pass through the intersection first. For example, in a case where the subject vehicle 101 that is going straight through the intersection is determined as the priority vehicle, and the other vehicles 103 and 104 are stopped due to a traffic jam ahead of the intersection where the subject vehicle 101 goes straight, it is reasonable to give way to the other vehicle 102 determined as the non-priority vehicle so that the other vehicle 102 passes through the intersection first. In other words, such traffic arrangement that forces the other vehicle 102 to wait for a right turn until the subject vehicle 101 that cannot go straight due to a traffic jam passes through the intersection is inappropriate.

In this manner, the setting unit 133 makes an affirmative determination in S605 on the basis of the idea that it is more reasonable to allow the non-priority vehicle capable of traveling to pass through the intersection first in a situation where the priority vehicle cannot advance. On the other hand, in a situation where the priority vehicle advances, the setting unit 133 makes a negative determination in S605. In a case where an affirmative determination is made in S605, the processing proceeds to S606, and in a case where a negative determination is made in S605, the processing proceeds to S607.

In S606, the setting unit 133 sets the display mode of the virtual traffic light information for a case where the non-priority vehicle is caused to pass through first. More specifically, a display mode of red blinking (display for urging temporary stop) is set as the virtual signal display for the vehicle determined as the non-priority vehicle in S603, and a display mode of red lighting (display for urging stop) is set as the virtual signal display for the vehicle determined as the priority vehicle in S603.

In a case where it is detected that the vehicle determined as the priority vehicle has stopped on the basis of the movement information from the priority vehicle after setting the display mode of red blinking (display for urging temporary stop) as the virtual signal display for the vehicle determined as the non-priority vehicle, the setting unit 133 sets a display mode in which red blinking display as the virtual signal display for the vehicle determined as the non-priority vehicle is switched to yellow blinking display. As a result, the driver is urged to enter the intersection while paying attention to other traffic.

Further, in a case where it is detected that the vehicle determined as the non-priority vehicle has passed through the intersection on the basis of the movement information from the non-priority vehicle after setting the display mode of yellow blinking (display for urging entry to the intersection with caution) as the virtual signal display for the vehicle determined as the non-priority vehicle in S603, the setting unit 133 sets a display mode in which the red lighting display as the virtual signal display for the vehicle determined as the priority vehicle is switched to yellow blinking display. As a result, the driver is urged to enter the intersection while paying attention to other traffic. Thereafter, in a case where it is detected that the priority vehicle has passed the intersection on the basis of the movement information from the priority vehicle, the processing unit 13 ends the traffic arrangement at the intersection.

The processing unit 13 transmits the setting information of the virtual traffic light described above to the subject vehicle 101 and the other vehicle 102 via the communication unit 11. In a predetermined area of a predetermined data structure to be transmitted as the setting information of a virtual traffic light, for example, the vehicle ID of a vehicle that is a target for the virtual signal display is included. In a case where the vehicle ID of the own vehicle is included in the predetermined area of the setting information of the virtual traffic light received from the communication unit 11 of the server device 1, the processing unit 50 such as the in-vehicle terminals 101U and 102U of respective vehicles causes the display unit 53 to display the virtual signal display as illustrated in FIG. 1 on the basis of the setting information of the virtual traffic light. In a case where the vehicle ID of the own vehicle is not included in the predetermined area of the setting information of the virtual traffic light received from the communication unit 11 of the server device 1, the processing unit 50 such as the in-vehicle terminals 101U and 102U of respective vehicles does not perform the virtual signal display based on the setting information.

As the vehicle ID included in the setting information of the virtual traffic light, the vehicle ID included in the movement information received from each of the subject vehicle 101 and the other vehicle 102 by the communication unit 11 is used.

The processing unit 13 may transmit, together with the setting information of the virtual traffic light, audio message information notifying that a display mode of red blinking (display for urging temporary stop) is set as the virtual signal display for the other vehicle, to the vehicle for which a display mode of red lighting (display for urging stop) is set as the virtual signal display. Further, similarly, audio message information notifying that a display mode of red lighting (display for stop) is set as the virtual signal display for the other vehicle may be transmitted to the vehicle for which a display mode of red blinking (display for urging temporary stop) is set as the virtual signal display.

In a case where such processing is performed, the processing unit 13 ends the processing in FIG. 7, returns to FIG. 6, and ends the processing in FIG. 6.

In S607, the setting unit 133 sets the display mode of the virtual traffic light information for a case where the priority vehicle is caused to pass through first. More specifically, a display mode of red blinking (display for urging temporary stop) is set as the virtual signal display for the vehicle determined as the priority vehicle in S603, and a display mode of red lighting (display for urging stop) is set as the virtual signal display for the vehicle determined as the non-priority vehicle in S603.

In a case where it is detected that the vehicle determined as the non-priority vehicle has stopped on the basis of the movement information from the non-priority vehicle after setting the display mode of red blinking (display for urging temporary stop) as the virtual signal display for the vehicle determined as the priority vehicle, the setting unit 133 sets a display mode in which red blinking display as the virtual signal display for the vehicle determined as the priority vehicle is switched to yellow blinking display. As a result, the driver is urged to enter the intersection while paying attention to other traffic.

Further, in a case where it is detected that the vehicle determined as the priority vehicle has passed through the intersection on the basis of the movement information from the priority vehicle after setting the display mode of yellow blinking (display for urging entry to the intersection with caution) as the virtual signal display for the vehicle determined as the priority vehicle in S603, the setting unit 133 sets a display mode in which the red lighting display as the virtual signal display for the vehicle determined as the non-priority vehicle is switched to yellow blinking display. As a result, the driver is urged to enter the intersection while paying attention to other traffic. Thereafter, in a case where it is detected that the non-priority vehicle has passed the intersection on the basis of the movement information from the non-priority vehicle, the processing unit 13 ends the traffic arrangement at the intersection.

Similar to the case in S606, the processing unit 13 transmits the setting information of the virtual traffic light described above to the subject vehicle 101 and the other vehicle 102 via the communication unit 11. In a predetermined area of a predetermined data structure to be transmitted as the setting information of a virtual traffic light, the vehicle ID of a vehicle that is a target for the virtual signal display is included. In a case where the vehicle ID of the own vehicle is included in the predetermined area of the setting information of the virtual traffic light received from the communication unit 11 of the server device 1, the processing unit 50 such as the in-vehicle terminals 101U and 102U of respective vehicles causes the display unit 53 to display the virtual signal display as illustrated in FIG. 1 on the basis of the setting information of the virtual traffic light. In a case where the vehicle ID of the own vehicle is not included in the predetermined area of the setting information of the virtual traffic light received from the communication unit 11 of the server device 1, the processing unit 50 such as the in-vehicle terminals 101U and 102U of respective vehicles does not perform the virtual signal display based on the setting information.

As the vehicle ID included in the setting information of the virtual traffic light, similar to the case in S606, the vehicle ID included in the movement information received from each of the subject vehicle 101 and the other vehicle 102 by the communication unit 11 is used.

Similar to the case in S606, the processing unit 13 may transmit, together with the setting information of the virtual traffic light, audio message information notifying that a display mode of red blinking (display for urging temporary stop) is set as the virtual signal display for the other vehicle, to the vehicle for which a display mode of red lighting (display for urging stop) is set as the virtual signal display. Further, similarly, audio message information notifying that a display mode of red lighting (display for stop) is set as the virtual signal display for the other vehicle may be transmitted to the vehicle for which a display mode of red blinking (display for urging temporary stop) is set as the virtual signal display.

In a case where such processing is performed, the processing unit 13 ends the processing in FIG. 7, returns to FIG. 6, and ends the processing in FIG. 6.

Figure 8:
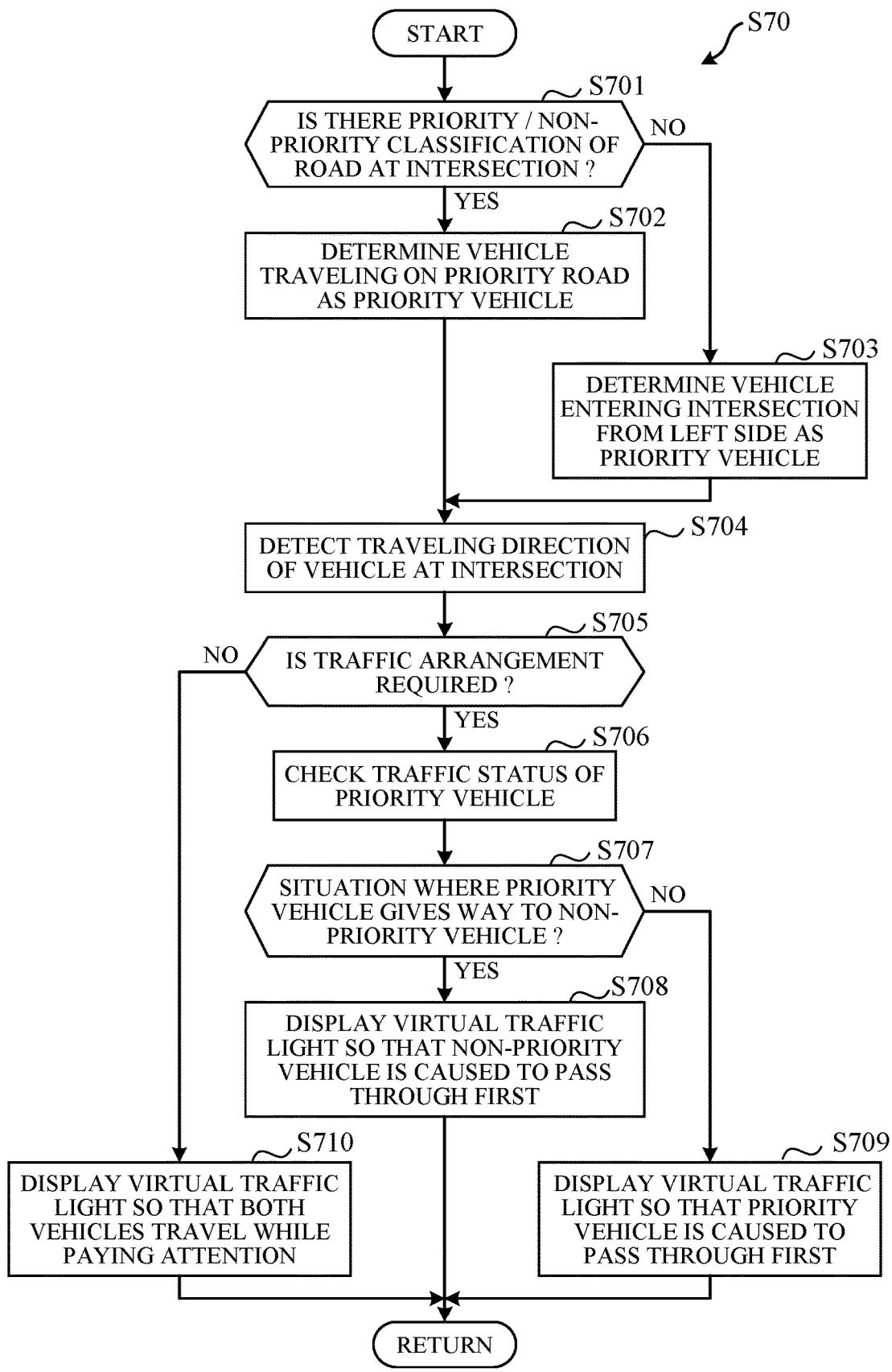
FIG. 8 is a flowchart illustrating another part of the flowchart of FIG. 6 in detail.

FIG. 8 is a flowchart illustrating an example of setting processing performed by the setting unit 133 in S70.

In S701, the setting unit 133 determines whether or not there is a priority/non-priority classification in the road at the intersection. By referring to the road database 141, the map database 142, and the traffic light database 143, the setting unit 133 makes an affirmative determination in S701 when there is a priority/non-priority classification of the road RD1 and RD2 intersecting at the intersection where no traffic light is provided. On the other hand, when there is no priority/non-priority classification in the road RD1 and RD2 intersecting at the intersection, the setting unit 133 makes a negative determination in S701. If an affirmative determination is made in S701, the processing proceeds to S702, and if a negative determination is made, the processing proceeds to S703.

In S702, the setting unit 133 determines, as the priority vehicle, a vehicle traveling on the priority road among the subject vehicle 101 and the other vehicle 102.

In S703, the setting unit 133, among the subject vehicle 101 and the other vehicles 102, determines the vehicle entering the intersection from the left side as the priority vehicle. For example, when the intersection to which the subject vehicle 101 and the other vehicles 102 is approaching is Example 1 of the intersection (FIG. 2A), the other vehicle 102 traveling from the west to the east on the road RD2 is determined as the priority vehicle. Unlike in Japan where the left-side traveling for the vehicle is defined, in a country where the right-side traveling for the vehicle is defined, the vehicle entering the intersection from the right side may be determined as the priority vehicle.

In S704, the setting unit 133 detects the traveling direction of the vehicle at the intersection. For example, the setting unit 133 detects the traveling directions of the subject vehicle 101 and the other vehicle 102 at the intersection that both the vehicles approach on the basis of the movement information (particularly, turn signal operation state) of the subject vehicle 101 and the other vehicle 102 received by the communication unit 11.

Next, in S705, the setting unit 133 determines whether or not a traffic arrangement is required. When the detected paths of the subject vehicle 101 and the other vehicle 102 intersect with each other, the setting unit 133 makes an affirmative determination in S705. On the other hand, when the detected paths of the two vehicles do not cross each other, the setting unit 133 makes a negative determination in S705. For example, when one of the subject vehicle 101 and the other vehicle 102 turns left and the other turns right, the paths of the two vehicles do not intersect with each other. If an affirmative determination is made in S705, the processing proceeds to S706, and if a negative determination is made, the processing proceeds to S710.

In S710, the setting unit 133 sets the display mode of yellow blinking as the virtual signal display for both the subject vehicle 101 and the other vehicle 102 so as to urge the drivers to travel while paying attention to other traffic, and then ends the processing in FIG. 7, and returns to FIG. 6 to end the processing in FIG. 6.

In S706, the setting unit 133 checks, in the external environment recognition unit 131, the traffic status (in particular, whether there is a traffic jam ahead of the intersection) of the vehicle determined as the priority vehicle, on the basis of the movement information of the subject vehicle 101 and the other vehicle 102 received by the communication unit 11.

Next, in S707, similar to the case in S605, the setting unit 133 determines whether or not the priority vehicle should allow the non-priority vehicle to pass through the intersection first. It is more reasonable to allow the non-priority vehicle capable of traveling to pass through the intersection first in a situation where the priority vehicle cannot advance. On the other hand, in a situation where the priority vehicle advances, the setting unit 133 makes a negative determination in S605. In this case, the setting makes an affirmative determination in S707. On the other hand, in a situation where the priority vehicle can advance, the setting unit 133 makes a negative determination in S707. If an affirmative determination is made in S707, the processing proceeds to 708, and if a negative determination is made, the processing proceed to S709.

In S708, the setting unit 133 sets the display mode of the virtual traffic light information for a case where the non-priority vehicle is caused to pass through first. More specifically, a display mode of red blinking (display for urging temporary stop) is set as the virtual signal display for the vehicle determined as the non-priority vehicle in S702 or S703, and a display mode of red lighting (display for urging stop) is set as the virtual signal display for the vehicle determined as the priority vehicle in S702 or 703.

In a case where it is detected that the vehicle determined as the priority vehicle has stopped on the basis of the movement information from the priority vehicle after setting the display mode of red blinking (display for urging temporary stop) as the virtual signal display for the vehicle determined as the non-priority vehicle, the setting unit 133 sets a display mode in which red blinking display as the virtual signal display for the vehicle determined as the non-priority vehicle is switched to yellow blinking display. As a result, the driver is urged to enter the intersection while paying attention to other traffic.

Further, in a case where it is detected that the vehicle determined as the non-priority vehicle has passed through the intersection on the basis of the movement information from the non-priority vehicle after setting the display mode of yellow blinking (display for urging entry to the intersection with caution) as the virtual signal display for the vehicle determined as the non-priority vehicle in S702 or S703, the setting unit 133 sets a display mode in which the red lighting display as the virtual signal display for the vehicle determined as the priority vehicle is switched to yellow blinking display. As a result, the driver is urged to enter the intersection while paying attention to other traffic. Thereafter, in a case where it is detected that the priority vehicle has passed the intersection on the basis of the movement information from the priority vehicle, the processing unit 13 ends the traffic arrangement at the intersection.

The processing unit 13 transmits the setting information of the virtual traffic light in the processing of S708 to the subject vehicle 101 and the other vehicle 102 via the communication unit 11. As described above, in a predetermined area of a predetermined data structure to be transmitted as the setting information of a virtual traffic light, for example, the vehicle ID of a vehicle that is a target for the virtual signal display is included. In a case where the vehicle ID of the own vehicle is included in the predetermined area of the setting information of the virtual traffic light received from the communication unit 11 of the server device 1, the processing unit 50 such as the in-vehicle terminals 101U and 102U of respective vehicles causes the display unit 53 to display the virtual signal display as illustrated in FIG. 1 on the basis of the setting information of the virtual traffic light. In a case where the vehicle ID of the own vehicle is not included in the predetermined area of the setting information of the virtual traffic light received from the communication unit 11 of the server device 1, the processing unit 50 such as the in-vehicle terminals 101U and 102U of respective vehicles does not perform the virtual signal display based on the setting information.

As the vehicle ID included in the setting information of the virtual traffic light, the vehicle ID included in the movement information received from each of the subject vehicle 101 and the other vehicle 102 by the communication unit 11 is used.

The processing unit 13 may transmit, together with the setting information of the virtual traffic light, audio message information notifying that a display mode of red blinking (display for urging temporary stop) is set as the virtual signal display for the other vehicle, to the vehicle for which a display mode of red lighting (display for urging stop) is set as the virtual signal display. Further, similarly, audio message information notifying that a display mode of red lighting (display for stop) is set as the virtual signal display for the other vehicle may be transmitted to the vehicle for which a display mode of red blinking (display for urging temporary stop) is set as the virtual signal display.

In a case where such processing is performed, the processing unit 13 ends the processing in FIG. 8, returns to FIG. 6, and ends the processing in FIG. 6.

In S709, the setting unit 133 sets the display mode of the virtual traffic light information for a case where the priority vehicle is caused to pass through first. More specifically, a display mode of red blinking (display for urging temporary stop) is set as the virtual signal display for the vehicle determined as the priority vehicle in S702 or S703, and a display mode of red lighting (display for urging stop) is set as the virtual signal display for the vehicle determined as the non-priority vehicle in S702 or S703.

In a case where it is detected that the vehicle determined as the non-priority vehicle has stopped on the basis of the movement information from the non-priority vehicle after setting the display mode of red blinking (display for urging temporary stop) as the virtual signal display for the vehicle determined as the priority vehicle, the setting unit 133 sets a display mode in which red blinking display as the virtual signal display for the vehicle determined as the priority vehicle is switched to yellow blinking display. As a result, the driver is urged to enter the intersection while paying attention to other traffic.

Further, in a case where it is detected that the vehicle determined as the priority vehicle has passed through the intersection on the basis of the movement information from the priority vehicle after setting the display mode of yellow blinking (display for urging entry to the intersection with caution) as the virtual signal display for the vehicle determined as the priority vehicle in S702 or S703, the setting unit 133 sets a display mode in which the red lighting display as the virtual signal display for the vehicle determined as the non-priority vehicle is switched to yellow blinking display. As a result, the driver is urged to enter the intersection while paying attention to other traffic. Thereafter, in a case where it is detected that the non-priority vehicle has passed the intersection on the basis of the movement information from the non-priority vehicle, the processing unit 13 ends the traffic arrangement at the intersection. Similar to the case in S607, the processing unit 13 transmits the setting information of the virtual traffic light described above to the subject vehicle 101 and the other vehicle 102 via the communication unit 11. In a predetermined area of a predetermined data structure to be transmitted as the setting information of a virtual traffic light, the vehicle ID of a vehicle that is a target for the virtual signal display is included. In a case where the vehicle ID of the own vehicle is included in the predetermined area of the setting information of the virtual traffic light received from the communication unit 11 of the server device 1, the processing unit 50 such as the in-vehicle terminals 101U and 102U of respective vehicles causes the display unit 53 to display the virtual signal display as illustrated in FIG. 1 on the basis of the setting information of the virtual traffic light. In a case where the vehicle ID of the own vehicle is not included in the predetermined area of the setting information of the virtual traffic light received from the communication unit 11 of the server device 1, the processing unit 50 such as the in-vehicle terminals 101U and 102U of respective vehicles does not perform the virtual signal display based on the setting information.

As the vehicle ID included in the setting information of the virtual traffic light, similar to the case in S607, the vehicle ID included in the movement information received from each of the subject vehicle 101 and the other vehicle 102 by the communication unit 11 is used.

Similar to the case in S607, the processing unit 13 may transmit, together with the setting information of the virtual traffic light, audio message information notifying that a display mode of red blinking (display for urging temporary stop) is set as the virtual signal display for the other vehicle, to the vehicle for which a display mode of red lighting (display for urging stop) is set as the virtual signal display.

Further, similarly, audio message information notifying that a display mode of red lighting (display for stop) is set as the virtual signal display for the other vehicle may be transmitted to the vehicle for which a display mode of red blinking (display for urging temporary stop) is set as the virtual signal display.

In a case where such processing is performed, the processing unit 13 ends the processing in FIG. 8, returns to FIG. 6, and ends the processing in FIG. 6.

In the above description, for example, in a case where the setting unit 133 sets the display mode of red lighting (display for urging stop) as the virtual signal display for the other vehicle 102, but the driver of the other vehicle 102 does not stop the vehicle without following the set contents, in other words, in a case where the external environment recognition unit 131 recognizes that the vehicle has forcibly entered the intersection, the processing unit 13 may perform the following processing. That is, the setting unit 133 performs setting of switching the yellow blinking display to the display mode of red lighting (display for urging stop) on the subject vehicle 101 for which the display mode of yellow blinking (display for urging entry to the intersection with caution) has already been set as the virtual signal display. With this processing, it is possible to switch to a virtual signal display for more safely performing a traffic arrangement on the subject vehicle 101 in order to avoid contact with the other vehicle 102 that forcibly enters the intersection.

Further, in the above description, for example, in a case where the setting unit 133 sets the display mode of red lighting (display for urging stop) as the virtual signal display for the subject vehicle 101, but the external environment recognition unit 131 recognizes that the other vehicle 102 has passed through the intersection before the subject vehicle 101 reaches the same intersection, the processing unit 13 may perform the following processing. That is, the setting unit 133 performs setting of switching the red lighting display to the display mode of yellow blinking (display for urging entry to the intersection with caution) on the subject vehicle 101 for which the display mode of red lighting (display for urging stop) has already been set as the virtual signal display. By performing the processing in this manner, it is possible to switch to the virtual signal display for more appropriately performing the traffic arrangement without continuing to urge the subject vehicle 101 to stop wastefully.

According to the embodiments described above, the following operations and effects are obtained.

(1) Each of the subject vehicle 101 and the other vehicle 102 that travel at an intersection where no traffic light is installed includes the display unit 53 that displays the virtual traffic light and the communication unit 51 (FIG. 5). The server device 1 as the driving assistance apparatus 100 for these vehicles 101 and 102 includes the external environment recognition unit 131 that recognizes the surrounding environment of the subject vehicle 101 as a first vehicle, the external environment recognition unit 131 as a surrounding vehicle determination unit that determines the presence or absence of the other vehicle 102 as a second vehicle in the surrounding environment, the setting unit 133 that sets each display mode of the virtual traffic light for the subject vehicle 101 and the other vehicle 102 on the basis of the information acquired via the communication unit 51 and the determination result by the external environment recognition unit 131 as the surrounding vehicle determination unit, and the communication unit 11 as an output unit that transmits information indicating the display mode set by the setting unit 133 to the subject vehicle 101 and the other vehicle 102 (FIG. 4).

With such a configuration, for example, in a situation where it is difficult for the driver to make a quick determination as to which vehicle among the subject vehicle 101 and the other vehicle 102 is to be prioritized, the driving assistance apparatus 100 can appropriately perform the traffic arrangement between the intersecting vehicles.

In addition, since the driving assistance apparatus 100 displays a virtual traffic light having a clear meaning as a traffic rule on the display unit 53, it is possible to appropriately indicate to the driver whether to enter the intersection.

(2) The information acquired via the communication unit 11 includes position information, traveling direction, speed information, and turn signal operation information of each of the subject vehicle 101 and the other vehicle 102, and display information of the traffic light for pedestrians in a case where the traffic lights 201A and 201B for pedestrians for crossing the road RD1 on which the subject vehicle 101 travels are provided within a predetermined distance from the intersection. The server device 1 further includes the priority determination unit 132 that determines the level of the traffic priority of the subject vehicle 101 and the other vehicle 102 at the intersection on the basis of the information acquired via the communication unit 11 and the determination result of the external environment recognition unit 131 as the surrounding vehicle determination unit (FIG. 4). In a case where the priority determination unit 132 determines that the traffic priority of the subject vehicle 101 is higher than that of the other vehicle 102, the setting unit 133 sets yellow blinking as a first display mode meaning that traveling is allowed (i.e., meaning a travelable state), as the display mode of the virtual traffic light for the first vehicle, and in a case where the priority determination unit 132 determines that the traffic priority of the subject vehicle 101 is lower than that of the other vehicle 102, the setting unit 133 sets red lighting as a second display mode meaning stop, as the display mode of the virtual traffic light for the first vehicle (FIGS. 7 and 8).

With such a configuration, the driving assistance apparatus 100 can appropriately determine which of the subject vehicle 101 and the other vehicle 102 is to be prioritized, for example. Therefore, it is possible to prevent occurrence of a near miss or a contact accident caused by a difference in determination between the two, as in a case where the drivers determine which vehicle is to be prioritized.

(3) In a case where the external environment recognition unit 131 as the surrounding vehicle determination unit determines that the other vehicle 102 enters the intersection, the setting unit 133 sets the display mode of the virtual traffic light for the subject vehicle 101 to red lighting as the second display mode meaning stop (FIGS. 7 and 8).

With such a configuration, even in a situation where the subject vehicle 101 should be prioritized over the other vehicle 102, in a case where there is no sign of giving way to the other vehicle 102, or the like, it is possible to switch to the virtual signal display for more safely performing the traffic arrangement for the subject vehicle 101 in order to avoid contact between the subject vehicle 101 and the other vehicle 102.

(4) In a case where the external environment recognition unit 131 as the surrounding vehicle determination unit determines that the other vehicle 102 has passed through the intersection, the setting unit 133 sets the display mode of the virtual traffic light for the subject vehicle 101 to yellow blinking as the first display mode meaning that traveling is allowed (FIGS. 7 and 8).

With such a configuration, for example, in a situation where the other vehicle 102 has already passed through the intersection at the time when the subject vehicle 101 decelerates to stop, it is possible to switch to more appropriate virtual signal display by raising the priority of the subject vehicle 101 without continuing to urge the subject vehicle 101 to stop wastefully.

(5) The external environment recognition unit 131 as the surrounding vehicle determination unit further determines whether or not other vehicles 103 and 104 are stopped ahead of the intersection that the subject vehicle 101 travels straight. In a case where the external environment recognition unit 131 determines that the other vehicles 103 and 104 as third vehicles stop ahead of the intersection, the setting unit 133 sets the display mode of the virtual traffic light for the first vehicle to red lighting as the second display mode meaning stop.

With such a configuration, even in a situation where the subject vehicle 101 should be prioritized over the other vehicle 102, a smoother traffic flow can be realized by the subject vehicle 101, which is unable to pass through the intersection due to a traffic jam, allowing the other vehicle 102, which is able to pass through the intersection, to pass through the intersection.

(6) In a case where it is determined that the routes of the subject vehicle 101 and the other vehicle 102 do not cross each other on the basis of the information acquired via the communication unit 11 and the determination result of the external environment recognition unit 131, the setting unit 133 sets yellow blinking as the first display mode meaning that traveling is allowed, as the display mode of the virtual traffic light for the subject vehicle 101 and the other vehicle 102.

With such a configuration, it is possible to urge both vehicles passing through the intersection to drive carefully.

The above embodiment can be modified to various forms. Several modifications will be described below.

Modification 1

In the above embodiment, the server device 1 has a function as the driving assistance apparatus 100 and the driving assistance processing is executed in the server device 1. Alternatively, the same functions as those of the external environment recognition unit 131, the priority determination unit 132, and the setting unit 133 as the functional configuration performed by the processing unit 13 of the server device 1 may be included in the processing unit 50 such as the in-vehicle terminal 101U on the vehicle side.

In Modification 1, the processing unit 50, such as the in-vehicle terminal 101U, functions as the display control unit 501 and the audio control unit 502 by executing a program stored in a storage area in the CPU in advance, and functions in the same manner as the external environment recognition unit 131, the priority determination unit 132, and the setting unit 133 in the processing unit 13 of the server device 1.

In Modification 1, when the communication unit 11 of the server device 1 receives the movement information from the two vehicles (the subject vehicle 101 and the other vehicle 102) approaching the same intersection, the processing unit 13 controls the communication unit 11 so that the contents of the movement information of the other vehicle 102 received from the other vehicle 102 are transmitted to the subject vehicle 101, and the contents of the movement information of the subject vehicle 101 received from the subject vehicle 101 are transmitted to the other vehicle 102. Accordingly, the movement information of different vehicles is transmitted to each vehicle.

Further, the processing unit 13 refers to the road database 141 and the like in the memory unit 14, and controls the communication unit 11 to transmit the position information of the intersection where the subject vehicle 101 and the other vehicle 102 approach, the information of the priority road, the map information of the vicinity, and the like to the subject vehicle 101 and the other vehicle 102. As a result, the position information of the intersection approaching of the vehicles, the information of the priority road, the map information of the vicinity, and the like are transmitted to each vehicle.

With this configuration, the processing unit 50, such as the in-vehicle terminals 101U and 102U of the subject vehicle 101 and the other vehicle 102, can perform the same processing as the external environment recognition unit 131, the priority determination unit 132, and the setting unit 133 in the processing unit 13 of the server device 1.

According to Modification 1 described above, since the function of the setting unit 133 for setting the display mode of the virtual traffic light information such as passing the priority vehicle first is performed by the processing unit 50 such as the in-vehicle terminal 101U in the subject vehicle 101 or the like, even when the setting of the display mode of the virtual traffic light information cannot be performed by the server device 1, the setting can be performed on the vehicle.

Modification 2

In Modification 1 described above, a part of the functions of the driving assistance apparatus 100 included in the server device 1 in the embodiment is provided on the vehicle side. Alternatively, all of the functions as the driving assistance apparatus 100 provided in the server device 1 may be provided on the vehicle side, and the processing unit 50 in such as the in-vehicle terminal 101U on the vehicle side may be caused to perform the functions.

In Modification 2, the in-vehicle terminals 101U and 102U respectively mounted on the subject vehicle 101 and the other vehicle 102 are configured to be capable of inter-vehicle communication via the communication network 2, for example. The in-vehicle terminals 101U and 102U may perform direct inter-vehicle communication without using the communication network 2.

In Modification 2, the processing unit 50 in such as the in-vehicle terminal 101U, functions as the display control unit 501 and the audio control unit 502 by executing a program stored in a storage area in CPU in advance, and functions as a driving assistance apparatus in the same manner as the processing unit 13 of the server device 1.

According to Modification 2 described above, it is possible to set the information of the virtual traffic light as the driving assistance information even at the intersection of the management area where the server device 1 for driving assistance is not provided.

Modification 3

In the above description, the case where two vehicles of the subject vehicle 101 and the other vehicle 102 enter the intersection has been described as an example. Even when three or more vehicles enter the intersection, it is possible to deal with a combination of a correspondence between the case of the subject vehicle and the oncoming vehicle and a correspondence between the case of the subject vehicle and the crossing vehicle.

The present invention can also be used as a driving assistance method configured to perform a driving assistance for a first vehicle and a second vehicle traveling at an intersection where no traffic light is installed. In this case, each of the first vehicle and the second vehicle includes a display part displaying a virtual traffic light and a communication unit. The driving assistance method includes: recognizing a surrounding environment around the first vehicle; determining a presence or absence of the second vehicle in the surrounding environment; setting a display mode of the virtual traffic light for the first vehicle and the second vehicle, based on information acquired through the communication unit and a determination result of the presence or absence of the second vehicle; and transmitting information indicating the display mode to the first vehicle and the second vehicle through the communication unit.

The above embodiment can be combined as desired with one or more of the above modifications. The modifications can also be combined with one another.

According to the present invention, it is possible to appropriately perform a traffic arrangement for a plurality of vehicle at an intersection where no traffic light is installed.

Above, while the present invention has been described with reference to the preferred embodiments thereof, it will be understood, by those skilled in the art, that various changes and modifications may be made thereto without departing from the scope of the appended claims.

What is claimed is:

1. A driving assistance apparatus configured to perform a driving assistance for a first vehicle and a second vehicle traveling at an intersection where no traffic light is installed, each of the first vehicle and the second vehicle including a display part displaying a virtual traffic light and a communication unit, the information acquired through the communication unit including position information of the first vehicle and the second vehicle, information indicating traveling directions of the first vehicle and the second vehicle, vehicle speed information of the first vehicle and the second vehicle, turn signal operation information of the first vehicle and the second vehicle, and information indicating a state of a pedestrian traffic light for a pedestrian crossing a road on which the first vehicle travels, the pedestrian traffic light being installed within a predetermined distance from the intersection, the driving assistance apparatus comprising
an electronic control unit including a microprocessor and a memory connected to the microprocessor, wherein
the microprocessor is configured to perform
recognizing a surrounding environment around the first vehicle;
determining a presence or absence of the second vehicle in the surrounding environment;
setting a display mode of the virtual traffic light for the first vehicle and the second vehicle, based on information acquired through the communication unit and a determination result of the presence or absence of the second vehicle;
transmitting information indicating the display mode to the first vehicle and the second vehicle through the communication unit; and
determining a level of a traffic priority of the first vehicle and the second vehicle at the intersection, based on the information acquired through the communication unit and the determination result, and
the microprocessor is configured to further perform
the setting including setting a first display mode meaning a travelable state when it is determined that the traffic priority of the first vehicle is higher than the traffic priority of the second vehicle, while setting a second display mode meaning a stop when it is determined that the traffic priority of the first vehicle is lower than the traffic priority of the second vehicle, as the display mode of the virtual traffic light for the first vehicle.

2. The driving assistance apparatus according to claim 1, wherein
the microprocessor is configured to further perform
determining whether the second vehicle enters the intersection, and
the microprocessor is configured to perform
the setting including setting the second display mode when it is determined that the second vehicle enters the intersection, as the display mode of the virtual traffic light for the first vehicle.

3. The driving assistance apparatus according to claim 1, wherein
the microprocessor is configured to further perform
determining whether the second vehicle has passed through the intersection, and
the microprocessor is configured to perform
the setting including setting the first display mode when it is determined that the second vehicle has passed through the intersection, as the display mode of the virtual traffic light for the first vehicle.

4. The driving assistance apparatus according to claim 1, wherein
the microprocessor is configured to further perform
determining whether there is a third vehicle stopped ahead of the intersection, and
the microprocessor is configured to perform
the setting including setting the second display mode when it is determined that there is the third vehicle stopped ahead of the intersection, as the display mode of the virtual traffic light for the first vehicle.

5. The driving assistance apparatus according to claim 1, wherein
the microprocessor is configured to further perform
determining whether a path of the first vehicle and a path of the second vehicle cross each other based on the information acquired through the communication unit and the determination result of the presence or absence of the second vehicle, and
the microprocessor is configured to perform
the setting including setting the first display mode as the display mode of the virtual traffic light for the first vehicle and the second vehicle when it is determined that the path of the first vehicle and the path of the second vehicle do not cross each other.

6. The driving assistance apparatus according to claim 1, wherein
the microprocessor is configured to further perform
determining whether there is a third vehicle stopped ahead of the intersection, and
the microprocessor is configured to perform
the setting including setting the second display mode as the display mode of the virtual traffic light for the first vehicle when it is determined that there is the third vehicle stopped ahead of the intersection even if it is determined that the traffic priority of the first vehicle is higher than the traffic priority of the second vehicle.

7. The driving assistance apparatus according to claim 6, wherein
the microprocessor is configured to perform
the setting including setting the first display mode as the display mode of the virtual traffic light for the second vehicle when it is determined that the first vehicle has stopped after setting the second display mode as the display mode of the virtual traffic light for the first vehicle.

8. The driving assistance apparatus according to claim 7, wherein
the microprocessor is configured to perform
the setting including setting the first display mode as the display mode of the virtual traffic light for the first vehicle when it is determined that the second vehicle has passed through the intersection after setting the first display mode as the display mode of the virtual traffic light for the second vehicle.

9. The driving assistance apparatus according to claim 1, wherein
the microprocessor is configured to perform
the setting including setting the first display mode after setting a third display mode meaning a temporary stop as the display mode of the virtual traffic light for the first vehicle when it is determined that the traffic priority of the first vehicle is higher than the traffic priority of the second vehicle.

10. The driving assistance apparatus according to claim 9, wherein
the microprocessor is configured to perform
the setting including changing the display mode of the virtual traffic light for the first vehicle from the third display mode to the first display mode when it is determined that the second vehicle has stopped after setting the third display mode as the display mode of the virtual traffic light for the first vehicle.

11. The driving assistance apparatus according to claim 1, wherein
the first vehicle includes a first camera detecting an external circumstance around the first vehicle, and
the microprocessor is configured to perform
the recognizing including recognizing the surrounding environment around the first vehicle based on signal from the first camera or signal from a second camera provided at the intersection.

12. A driving assistance method configured to perform a driving assistance for a first vehicle and a second vehicle traveling at an intersection where no traffic light is installed, each of the first vehicle and the second vehicle including a display part displaying a virtual traffic light and a communication unit, the information acquired through the communication unit including position information of the first vehicle and the second vehicle, information indicating traveling directions of the first vehicle and the second vehicle, vehicle speed information of the first vehicle and the second vehicle, turn signal operation information of the first vehicle and the second vehicle, and information indicating a state of a pedestrian traffic light for a pedestrian crossing a road on which the first vehicle travels, the pedestrian traffic light being installed within a predetermined distance from the intersection,
the driving assistance method comprising:
recognizing a surrounding environment around the first vehicle;
determining a presence or absence of the second vehicle in the surrounding environment;
setting a display mode of the virtual traffic light for the first vehicle and the second vehicle, based on information acquired through the communication unit and a determination result of the presence or absence of the second vehicle;
transmitting information indicating the display mode to the first vehicle and the second vehicle through the communication unit; and
determining a level of a traffic priority of the first vehicle and the second vehicle at the intersection, based on the information acquired through the communication unit and the determination result, wherein
the setting includes setting a first display mode meaning a travelable state when it is determined that the traffic priority of the first vehicle is higher than the traffic priority of the second vehicle, while setting a second display mode meaning a stop when it is determined that the traffic priority of the first vehicle is lower than the traffic priority of the second vehicle, as the display mode of the virtual traffic light for the first vehicle.

* * * * *